March 11, 1941.  F. B. HEWEL  2,234,823
NONSKID TIRE
Filed March 17, 1938   2 Sheets-Sheet 1

WITNESSES:
E. E. Kiding

INVENTOR
Frank B. Hewel.
BY
William R. Coley
ATTORNEY

March 11, 1941.  F. B. HEWEL  2,234,823
NONSKID TIRE
Filed March 17, 1938  2 Sheets-Sheet 2

Patented Mar. 11, 1941

2,234,823

UNITED STATES PATENT OFFICE 2,234,823

NONSKID TIRE

Frank B. Hewel, Pittsburgh, Pa.

Application March 17, 1938, Serial No. 196,333

11 Claims. (Cl. 152—211)

My invention relates to tires and tire treads, and it has particular relation to the prevention of skidding.

One object of my invention is to provide a "built-in" or "vulcanized-in" metallic anti-skid device which will eliminate the necessity of any form of tire chains.

Another object of my invention is to provide a tire tread in which an anti-skid structure is withdrawn into the usual recess in the tread under normal operation thereof and is responsive to a skid of the tread on a traction surface for gripping the surface.

Another object of my invention is to provide a tire tread having preferably a plurality of staggered recesses and metallic inserts respectively disposed, preferably vulcanized, therein for anti-skid purposes.

A further object of my invention is to provide a tread of the character set forth in which the metallic insert is preferably of channel shape with its outer edges normally substantially flush with or slightly below the outer surface of the tread, but adapted to protrude above the surface in the event of skidding action.

Another object of my invention is to provide a tire tread, a recess in which has outwardly converging sides with channel-shaped metallic inserts preferably vulcanized therein, whereby, during normal operation of the tread, the edges of the inserts are depressed, but upon skidding action they straighten out and protrude beyond the surface of the tread to provide an anti-skidding action.

Still another object of my invention is to provide a device of the character set forth in which the anti-skid side members are detachably secured to a base vulcanized or molded in the recess.

Other objects of my invention will become evident from the following detailed description, taken in conjunction with the accompanying drawings, in which.

Referring to Figs. 1, 2, 3, 5 and 6 of the drawings, the structure there shown comprises a tire or tire tread 1 having side walls 2, in the case of a complete tire, and provided with a plurality of tread surface recesses 3 which are staggered with respect to each other, extending from the opposite side walls, and these spaced recesses extending at an acute angle to the axis of the tire tread to assist in preventing side skid as well as forward or rearward sliding.

Figure 5:
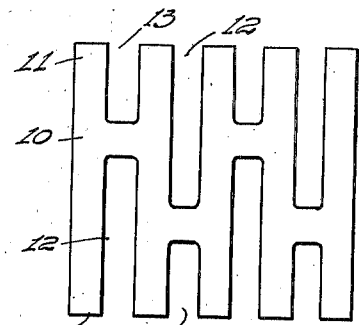
Fig. 5 is a developed view and Fig. 6 a perspective view of the final form of the metallic insert.
Figure 6:
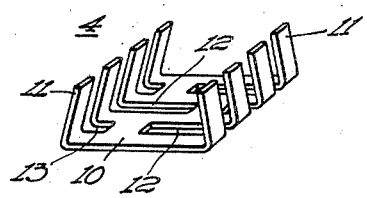

In each recess, a channel-shaped insert 4 having the developed or stamped-out form shown in Fig. 5 and the final form shown in Fig. 6 is disposed in such manner that the upper edges of the toothed sides of the insert extend substantially flush with or slightly below the tread surface, preferably the complete insert being molded or vulcanized in position within the recess. One method of vulcanization which may be employed is that disclosed in Patent No. 2,017,071, dated October 15, 1935, to H. R. Minor. However, it will be understood that any other suitable method of holding the metallic insert in position may be employed.

Since the rubber used for treads in some cases is not properly mixed to adhere to metal, it is preferable to effect the desired vulcanization in my invention by applying a thin layer of rubber specially adapted for such adhesion containing a suitable accelerator, whereby this layer may be readily vulcanized to the metal, following the teachings of said Minor patent and, of course, to the adjacent rubber of the tread.

Figure 1:
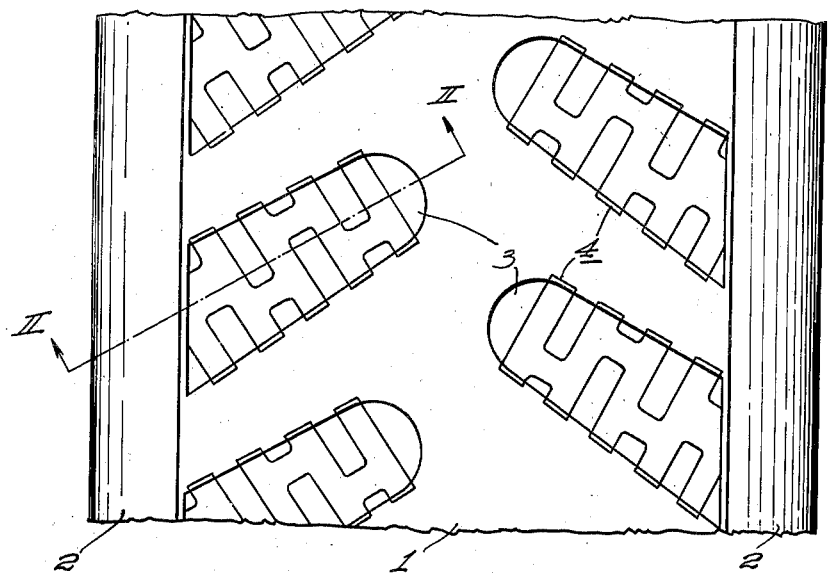
Figure 1 is a top plan view of a portion of a tire embodying my present invention.
Figure 2:
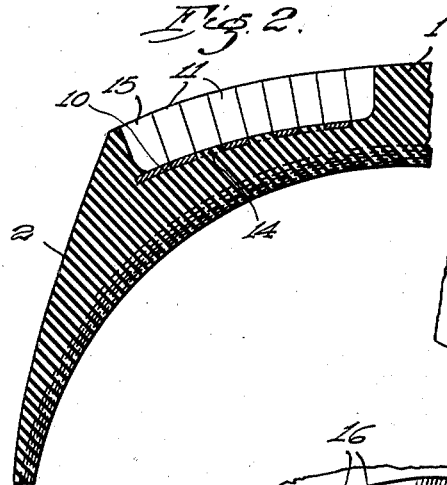
Fig. 2 is a longitudinal section along the line II—II of Fig. 1.
Figure 3:
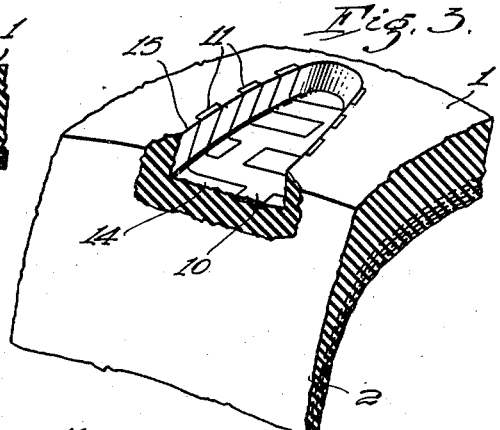
Figs. 3 and 4 are perspective views, with parts broken away, of two different forms of the metallic insert embodied in the tire shown in Fig. 1.
Figure 4:
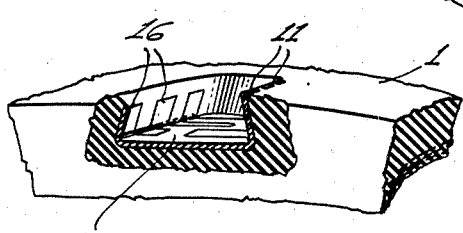

Each metallic insert preferably comprises a slotted base member 10, together with teeth or projections 11 extending on opposite sides thereof, being separated by long or short slots 12 and 13, and the ends of the teeth or projections being bent toward each other (that is, converging outwardly), as shown in Fig. 6, for example, so that they may fit within the converging walls or sides of the recesses 3, which converging feature is shown in Figs. 3 and 4, for example.

The solid portions of the base 10 and the teeth 11, as previously noted, are molded or vulcanized within the corresponding recess 3, and the ends of the teeth or projections 11 lie substantially flush with or slightly below the edges 15 of the corresponding recess, as shown in Fig. 3, for example. However, if desired, the base 10 alone may be vulcanized to the base 14 of the corresponding recess, leaving teeth 11 free.

In the modification shown in Fig. 4, the forward edges 16 of the vulcanized-in metallic insert 4 are shorter than the edges on the rear side. In such a case, the tire would be available for anti-skid action only when traveling in a forward direction, since only the rear teeth 11 would grip the traction surface, whereas with teeth 11 provided on both sides of each recess 3, gripping action is provided, whether the tire is proceeding forward or backward, as hereinafter more fully explained.

The inserts 4 are preferably of spring steel, whereby the teeth 11 tend to straighten out from their normal illustrated bent position, although any other suitable material may be employed. It will also be appreciated that my metallic inserts, in addition to being incorporated in new tires, may also be employed in connection with retreads or recaps when desired.

The operation of my invention may be set forth as follows: Under normal conditions, that is, when the tire or tire tread is proceeding backward or forward along a traction surface in a straight line, the inclined sides of each recess 3 permit the upper edges 15 thereof, together with the teeth 11 of the metallic inserts, to be compressed inwardly so that the metallic insert does not contact the traction surface. However, in the case of a skid or slide, the rubber near the rear end of each recess 3 encountering the traction surface is temporarily pulled or stretched backward, thereby straightening out the corresponding side of the recess 3, whereupon the corresponding teeth 11 of the resilient metallic insert likewise straighten out and protrude beyond the surface of the tread to grip the ice, snow or other surface on which the tread is operating, thus providing an effective anti-skid action. Such action persists until the skid is straightened out and then the teeth 11 are, in effect, withdrawn into the recesses 3 again for subsequent normal operation of the tire tread.

Figure 7:
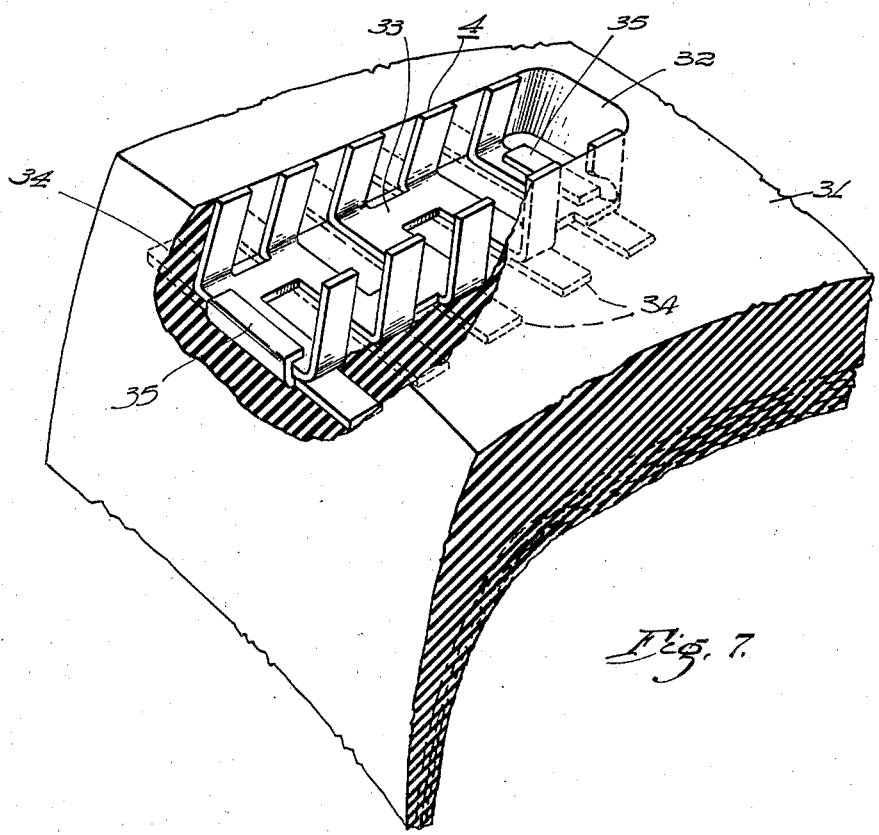
Fig. 7 is a perspective view of a further modification of the metallic insert structure.

The modification of my invention shown in Fig. 7 comprises a tread portion 31 having an aperture 32, to the base or bottom of which a plate or base member 33, which may be like that shown in Fig. 5, is suitably vulcanized or molded, side teeth 34 thereof extending laterally into and being vulcanized to the tread rubber to provide a firm grip. The front and rear edges of the base 33 are upturned or provided with wide hook portions 35, for a purpose to be described. A detachable anti-skid structure, such as 4 (Fig. 6), may be temporarily bent between the fingers and snapped within the bent-over portions 35. The structure 4, being resilient in character, may be readily compressed sufficiently to permit attachment or detachment thereof with the permanent base member 33. Any desired number of such detachable devices may, of course, be employed in the various recesses.

It will be seen that I have thus provided a form of "built-in" anti-skid device which, under normal operating conditions, is inoperative, but which, in response to a skidding or sliding action, projects teeth for gripping the traction surface. Such anti-skid device may be either permanently secured in the tread recesses or may be made of a detachable type, as desired.

I do not wish to be restricted to the particular structural details or arrangement of parts herein set forth, as various further modifications thereof may be effected without departing from the spirit and scope of my invention. I desire, therefore, that only such limitations shall be imposed thereon as are indicated in the appended claims.

I claim as my invention:

1. A tire tread having a recess with outwardly converging sides and a metallic channel-shaped insert secured to the base of said recess and having its sides provided with teeth, said teeth extending upwardly along and movable with the respective sides of the recess under various driving conditions, the outer ends of said teeth being normally disposed substantially flush with the tire tread surface.

2. A tire tread having a recess with outwardly converging sides and a metallic channel-shaped insert secured to the base of said recess and having at least one side portion permanently secured to a converging side of the recess and normally depressed below the outer surface of the tread as the tread encounters a traction surface, whereby upon the occurrence of skidding said converging side straightens out and said side portion protrudes beyond said tread surface.

3. A tire tread having a recess with outwardly converging sides and a metallic channel-shaped insert secured to the base of said recess and having at least one side portion provided with teeth permanently secured to a converging side of the recess and normally depressed below the outer surface of the tread as the tread encounters a traction surface, whereby upon the occurrence of skidding said converging side and said teeth straighten out together and said teeth protrude beyond said tread surface.

4. A tire tread having a recess with outwardly converging sides, a metallic insert secured to the base thereof, and an outwardly extending thin-walled structure detachably secured to said insert and having its walls extending along the sides of said recess, the outer ends of said walls being normally disposed substantially flush with the tire tread surface.

5. A tire tread having a recess, a metallic insert secured to the base thereof and having spaced attachment portions disposed above said base, and a channel-shaped structure contacting the sides of said recess and detachably secured to said attachment portions, the walls of said structure having their outer ends normally disposed substantially flush with the tire tread surface.

6. A tire tread having a recess with outwardly converging sides and separate metallic inserts permanently secured in the respective side walls of the recess, the outer ends of said inserts being normally disposed substantially flush with the tire tread surface.

7. A tire tread having a recess with outwardly converging sides and flexible metallic inserts permanently secured in said sides, the outer ends of said inserts being normally disposed substantially flush with the tire tread surface, the inserts in the respective sides varying their angularity to the traction surface in accordance with the angularity of the respective sides as varied in one direction or the other dependent upon the frictional contact of the portion of the tread surface adjacent said recess with said traction surface.

8. A tire tread having a recess with outwardly converging sides and a metallic insert therein having separate side portions secured in the respective sides and its outer edges normally substantially flush with the outer surface of the tread when said sides are depressed under normal driving conditions but adapted to protrude above said surface upon skidding action of the tread when the corresponding side increases its angularity.

9. A tire tread having a recess with outwardly converging sides and a metallic channel-shaped insert secured to the base of said recess and having its side portions extending upwardly along and movable with the respective sides of the recess under various driving conditions, the outer ends of said side portions being normally disposed substantially flush with the tire tread surface.

10. A tire tread having a recess with at least one side converging outwardly toward the other side and a metallic channel-shaped insert secured to the base of said recess, and having at least one side portion permanently secured to said converging side of the recess and normally depressed below the outer surface of the tread as the tread encounters a traction surface, whereby upon the occurrence of skidding said converging side increases its angularity and said side portion protrudes into nonskidding contact with said traction surface.

11. A tire tread having a recess with at least one side converging outwardly toward the other side and a metallic channel-shaped insert secured to the base of said recess and having at least one side portion provided with teeth permanently secured to said converging side and normally depressed below the outer surface of the tread as the tread encounters a traction surface, whereby upon the occurrence of skidding said converging side increases its angularity and said teeth protrude beyond into nonskidding contact with said traction surface.

FRANK B. HEWEL.